May 17, 1949.  L. J. BROMERT  2,470,335

LAWN MOWER SHARPENER

Filed Sept. 2, 1948

Leo J. Bromert
INVENTOR.

BY

Patented May 17, 1949

2,470,335

UNITED STATES PATENT OFFICE 2,470,335

LAWN MOWER SHARPENER

Leo J. Bromert, Hutchinson, Kans.

Application September 2, 1948, Serial No. 47,477

2 Claims. (Cl. 51—250)

The present invention relates to certain new and useful improvements in lawn mower sharpeners and has more particular reference to a type of sharpener which is adapted for use in association with a known wheeled-type push-pull mower, characterized, as usual, by a rotary bladed cutting reel.

Persons familiar with the stated lawn mowers and sharpeners of the type herein disclosed are aware that many and varied types and forms of sharpeners have been adopted and used and that, generically speaking, it is common practice to employ a sharpener which is characterized by an abrasive-equipped backing plate which, in practice, poses the abrasive surface where the rotating cutter blades have wiping contact with said surface for repeated intermittent sharpening. It is generally the practice to hingedly connect the backing plate, along one longitudinal edge, with a rod which is a part of the framework of the mower construction.

In carrying out the present invention and in reducing to practice the improvements devised therein, I likewise provide a substantially rectangular or equivalent backing plate, equip same with abradent blade-sharpening surfaces, and, in addition, provide improved means for mounting said backing plate on the stated rod, said means preferably having to do with simple spring-equipped hooks, the hook portions being releasably mounted on said rod.

Another object of the invention is to provide a backing plate which may be of wood or plastic and which has simple openings at its four corner portions, these to accommodate the simplified attaching and pivoting hooks.

A still further object of the invention is to provide the aforementioned backing plate, the same being rectangular and of an appropriate length to rest rockably and satisfactorily on the supporting rod, said plate being detachably hooked and fulcrumed on said rod and opposite faces being provided with selectively usable abrasive surfaces, thus making it possible to double the utility of the sharpener.

Other objects and advantages will become more readily apparent from the following description and the accompanying illustrative drawings.

In the drawings, wherein like numerals are employed to designate like parts throughout the views.

Figure 1:
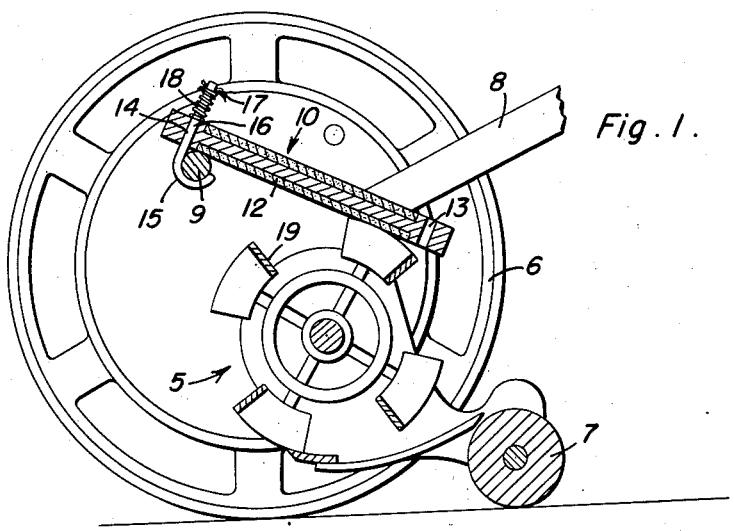
Figure 1 is a view showing essential portions of the wheeled reel-type lawn mower and showing my improved sharpener and the manner in which same is mounted for use, the parts of the view being in section and in elevation.
Figure 2:
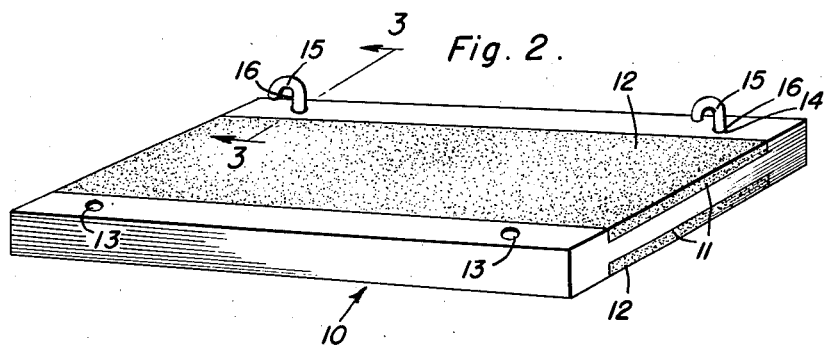
Figure 2 is a perspective view of the sharpener per se.
Figure 3:
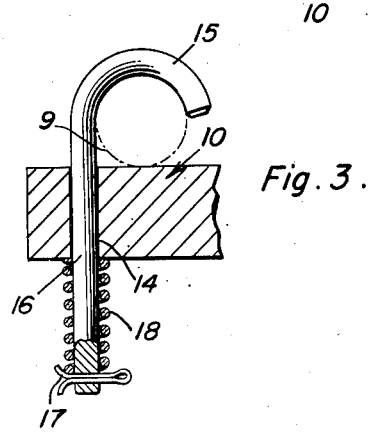
Figure 3 is an enlarged fragmentary sectional and elevational view which may be said to have been taken approximately on the line 3—3 of Figure 2, looking in the direction of the arrows.

Referring now to the drawings by reference numerals and lead lines, and to Figure 1, it will be seen that the numeral 5 designates a common type of rotary bladed grass cutting reel mounted in a framework including a ground-engaging wheel 6, an idling guide roller 7, handle means 8 and a brace and assembling cross rod 9. It is to the latter that most sharpeners, of the kind herein under consideration, are connected.

My improved sharpened comprises a substantially rectangular plate which may be of wood, plastic, or suitable stock and the same is denoted by the numeral 10. The sides which face and coact with the cutter-reel are formed with grooves or channels 11 which open through opposite transverse ends of the plate and fitted in these grooves and secured in place are suitable abrasive inserts or fillers 12 which, in practice, have wiping contact with the cutting edges of the blades of the reel 5, as shown. The four corner portions are provided with what may be conveniently called bolt holes 13 along one edge, and like holes 14 along the opposite edge.

The stated holes are adapted to accommodate the attaching and pivoting hooks, the latter being used in pairs and denoted by the numerals 15. More specifically, the shank portion 16 of the hook extends through the hole and is apertured to accommodate a cotter-key 17 which serves to assemble and hold in place a cushioning and tensioning spring 18. The spring exerts sufficient pressure against the coacting surface of the plate 10 to facilitate holding it in close rockable contact on the cross-rod 9, and in addition, to impose yieldable pressure of the abrasive means 12 against the cutting edges of the blades 19, as is evident from the showing made in Figure 1. The spring means also allows sufficient play between the plate and the cross-rod 9 to expedite the steps of attaching and detaching the stated hooks 15.

Attention is directed to the fact that a simple wooden board with abradant or equivalent surfaces on both sides for wiping contact with the cutter blades and with four corner holes permits the use of spring-retained, simple hooks and that the hooks may be interchangeably employed in relation to the holes 13 and 14. Thus, either longitudinal edge portion of the plate may be hingedly hooked on the cross rod 9 and either of two sharpening faces may be brought into use.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A sharpener for attachment to an existing cross-rod in the frame structure of a conventional reel-type lawn mower comprising a substantially flat rectangular plate provided on one side with abrasive media adapted for wiping contact with the cutting blades of the stated reel, said plate being provided at its corner portions with soles to accommodate fasteners, and fasteners, each fastener including an attaching hook and a shank portion, the shank portion being removably mounted in a selected hole and being provided with a cotter-key and further provided with a coiled spring, the coiled spring surrounding the shank between the cotter-key and an adjacent surface of said plate.

2. A lawn mower sharpener of the class described, comprising an abrasive-equipped plate having a pair of holes, and a fastener removably mounted in each hole, the fastener comprising an attaching and hinging hook, a shank carried by said hook, the shank extending slidably through the coacting hole, the free end portion of the shank being provided with a removable cotter-key, and a coiled spring surrounding said shank and interposed between the key and plate.

LEO J. BROMERT.

REFERENCES CITED

The following references are of record in the file of this patent:

UNITED STATES PATENTS

| Number | Name | Date |
|---|---|---|
| 627,863 | Maynard | June 27, 1899 |
| 907,245 | Kenney | Dec. 22, 1908 |
| 1,843,830 | Michalski | Feb. 2, 1932 |